(No Model.)

C. F. BRUSH.
SECONDARY BATTERY.

No. 275,985. Patented Apr. 17, 1883.

2 Sheets—Sheet 1.

*Case G*

WITNESSES
Ernest O. Orsburn.
Jno. Crowell Jr

INVENTOR
Charles F. Brush
By Leggett & Leggett
ATTORNEYS (No Model.) 2 Sheets—Sheet 2.
C. F. BRUSH.
SECONDARY BATTERY.
No. 275,985. Patented Apr. 17, 1883.
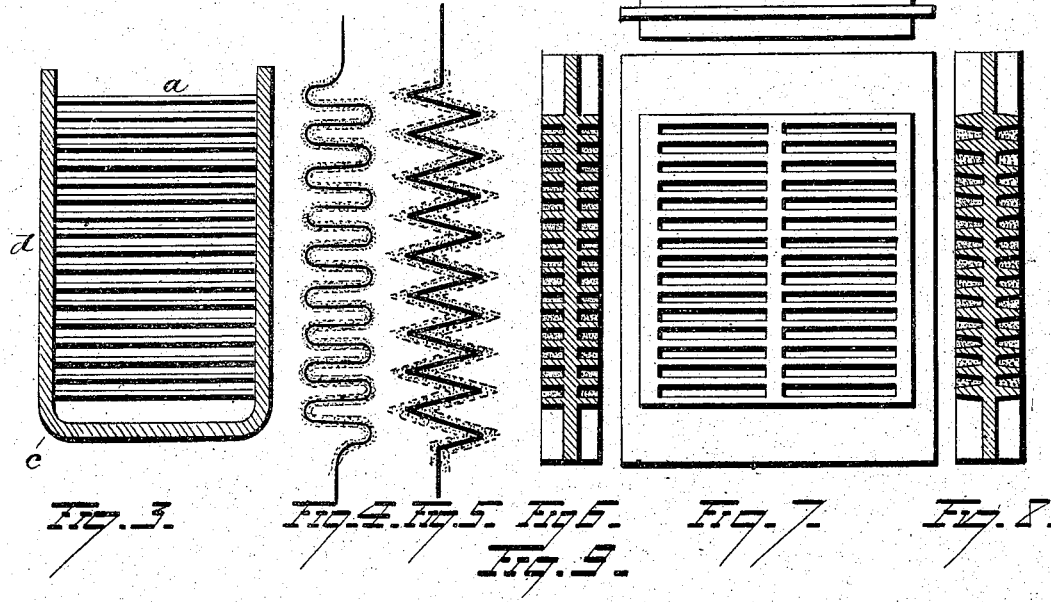
Fig. 3.   Fig. 4. Fig. 5. Fig. 6.   Fig. 7.   Fig. 8.
Fig. 9.
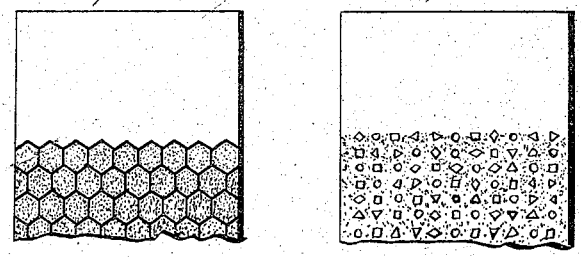
Fig. 10.   Fig. 11.
Fig. 12.
WITNESSES
P. E. Nottingham
George Cook
INVENTOR
Chas. F. Brush
By Leggett & Leggett
Attorneys

UNITED STATES PATENT OFFICE.

CHARLES F. BRUSH, OF CLEVELAND, OHIO.

SECONDARY BATTERY.

SPECIFICATION forming part of Letters Patent No. 275,985, dated April 17, 1883.

Application filed June 9, 1881. (No model.)

*To all whom it may concern:*

Be it known that I, CHARLES F. BRUSH, of Cleveland, in the county of Cuyahoga and State of Ohio, have invented certain new and useful Improvements in Secondary Batteries; and I do hereby declare the following to be a full, clear, and exact description of the invention, such as will enable others skilled in the art to which it pertains to make and use it, reference being had to the accompanying drawings which form part of this specification.

My invention relates to secondary batteries; and it consists in certain improvements in the construction and arrangement of the parts and elements of a secondary battery, as will hereinafter be described, and pointed out in the claims.

Figure 1:
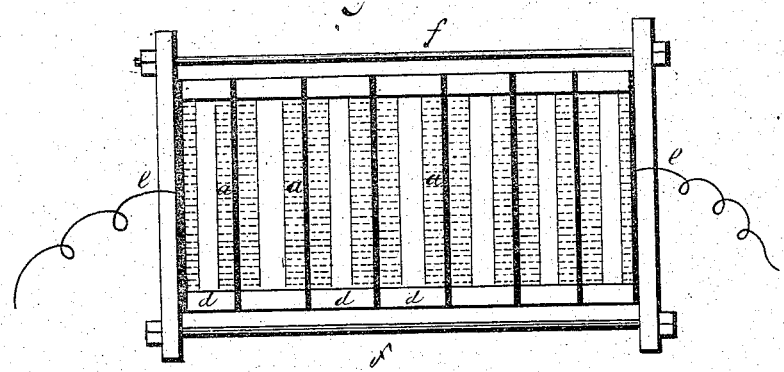
Figure 2:
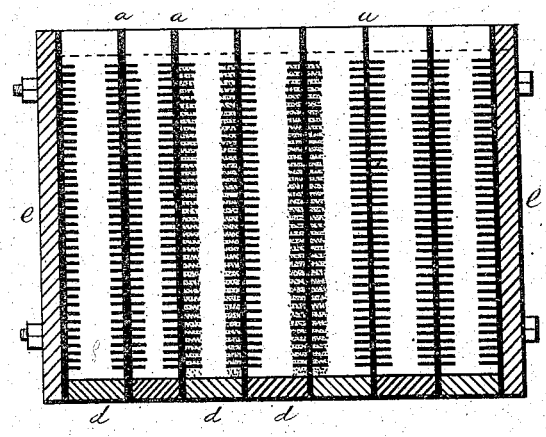

In the accompanying drawings, Figure 1 shows a plan view of a secondary battery constructed according to my invention. Fig. 2 is a vertical section of the same. Fig. 3 is a transverse section through the battery, showing the insulating-strip and one of the plates or elements. Figs. 4 and 5 show forms of corrugated plates. Fig. 6 is a vertical section of a ribbed plate. Fig. 7 is a plan and top view of a ribbed plate. Fig. 8 is a vertical section of the ribbed plate shown in Figs. 7 and 9. Fig. 9 represents different forms of ribbed plates. Fig. 10 is a honey-comb plate. Fig. 11 is a studded plate, and Fig. 12 is a ribbed corrugated plate.

In these figures, $a\ a\ a$ are ribbed plates, each provided with a plain or unribbed margin. The plates, arranged as shown, are supported and separated by U-shaped strips or bars $d\ d$, of insulating material, impervious to and unacted on by the liquid used in the battery, and preferably somewhat elastic, so as better to insure a water-tight joint with the plates. The end plates are protected and sustained by plates or bars $e\ e$, of wood or other suitable material, and the whole battery is bound firmly together by bolts $f$, passing through these end pieces. The spaces between the ribbed plates are filled with dilute sulphuric acid or other suitable liquid, and the extreme plates (ribbed on the exposed side only) form the terminals of the battery, as indicated.

The separating-strips $d\ d$ may, if desired, extend entirely round the margin of the plates $a\ a$, and thus form completely-inclosed cells between the plates, which cells may or may not be provided with a gas-vent. Such closed or nearly closed cells are very convenient when portable apparatus is desired. Evaporation of inclosed liquid is also prevented thereby, and uniformity of the latter may be insured by occasional partial or complete inversion of the apparatus.

Not only may plain plates or sheets of lead or other suitable material be employed in this construction of battery, but corrugated, ribbed, studded, cellular, or equivalent plates may also be used, and the plates of whatever description may be "formed" or developed in any suitable manner; or they may be provided or combined with an active coating of any description, applied by any suitable process or processes. These plates are immersed in a battery-fluid in which the active coating is insoluble. The plates, arranged as shown in the drawings, form the principal walls of the vessel or vessels containing the liquid in contact with the said plates, and when several cells are arranged in series for high electro-motive force one side of a plate or element will form the positive side of one cell, while the other side of the same plate forms the negative side of the adjoining cell. Thus great economy is effected, both in cost of construction of a battery and space occupied. The active coating may be formed or produced on the surface of the plate by the oxidizing action of an electric current; or porous or spongy lead may be applied through the agency of the electricity or mechanically; or oxide of lead or a compound containing lead may be applied to the plate and reduced to porous metallic lead by a reducing atmosphere.

Having fully described my invention, what I claim as new, and desire to secure by Letters Patent, is—

1. The combination, in a secondary battery, of plates or elements provided with an active coating, with separating and insulating strips, and a battery-fluid in which the said active coating is insoluble, substantially as set forth.

2. The combination of a series of plates or elements made cellular, grooved, or ribbed, and furnished with an active coating, with strips arranged and adapted to separate and insulate the plates, and a battery-fluid in which the said active coating is insoluble, substantially as set forth.

3. The combination of a series of plates or elements made cellular, grooved, or ribbed, and furnished with an active coating, with strips arranged and adapted to separate and insulate the plates and form separate open-top cells, and a battery-fluid in which the said active coating is insoluble, substantially as set forth.

4. The combination of a series of plates or elements of a secondary battery, constructed with their adjacent faces of "étagère" form, and provided with an active coating, with strips arranged and adapted to separate and insulate the plates or elements, substantially as set forth.

In testimony whereof I have signed my name to this specification in the presence of two subscribing witnesses.

CHARLES F. BRUSH.

Witnesses:
JNO. CROWELL, Jr.,
ALBERT E. LYNCH.